United States Patent Office 3,824,279
Patented July 16, 1974

3,824,279
PROCESS FOR PREPARING SALTS OF ETHER
POLYCARBOXYLIC ACID
Vincent Lamberti, Upper Saddle River, N.J., assignor to Lever Brothers Company, New York, N.Y.
No Drawing. Continuation-in-part of abandoned application Ser. No. 152,457, June 11, 1971. This application Nov. 10, 1972, Ser. No. 305,626
Int. Cl. C07c 59/22
U.S. Cl. 260—535 P             17 Claims

ABSTRACT OF THE DISCLOSURE

A method for preparing salts of ether polycarboxylic acids, particularly salts of carboxymethyloxysuccinic acid, by reacting in an aqueous alkaline medium an aldehyde and an alkaline earth metal or alkali metal cyanide and an alkali metal or alkaline earth metal salt of an unsaturated polycarboxylic acid at temperatures from about 25° C. to about 200° C.

This application is a continuation-in-part of co-pending application, Cer. No. 152,457, filed June 11, 1971; now abandoned.

BACKGROUND OF THE INVENTION

Alkali metal salts of carboxymethyloxysuccinic acid have heretofore been prepared by the reaction of the mixed calcium salt of glycolic acid and maleic acid in aqueous alkaline medium and subsequent exchange of the calcium cations with the desired alkali metal cation. While this novel method gives excellent yields of carboxymethyloxysuccinate salts, the method depends on glycolic acid as one of the reactants. Glycolic acid, while a material of commerce, is presently prepared by a high pressure reaction of formaldehyde, carbon monoxide and water. The pressure equipment required is very expensive and is limited to the size to which it can be scaled-up. Accordingly, the manufacture of glycolic acid has a built-in high processing cost which cannot be substantially reduced even at high multi-million pound production volumes.

It is an object of this invention to provide a process for preparing salts of ether polycarboxylic acids.

It is another object of this invention to produce salts of carboxymethyloxysuccinic acid by a route which eliminates the direct use of glycolic acid and thereby achieves a substantial decrease in cost of producing salts of carboxymethyloxysuccinic acid.

It is another object of the present invention to provide a process for preparing analogs and homologues of carboxymethyloxysuccinic acid and salts thereof.

DESCRIPTION OF THE INVENTION

It has now been found that an aldehyde alkali metal and/or alkaline earth metal cyanides can be reacted directly with an alkali metal and/or alkaline earth metal salts of an unsaturated polycarboxylic acid in aqueous alkaline medium to produce the corresponding salts of ether polycarboxylic acid in high yield. In a preferred aspect of the invention, it has been found that formaldehyde, alkali metal and/or alkaline earth metal cyanides, can be reacted directly with alkali metal and/or alkaline earth metal salts of maleic acid in aqueous alkaline medium to produce the corresponding salts of carboxymethyl-oxysuccinic acid in high yield. The overall reaction can be represented as follows:

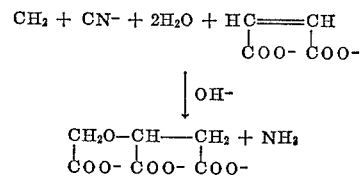

Thus broadly stated, in preparing salts of carboxymethyloxysuccinic acid by the present invention formaldehyde is permitted to react with maleic anhydride or a salt of maleic acid and an alkali metal or alkaline earth metal cyanide in an aqueous alkaline medium maintained at a pH of about 8 to about 13 (but preferably at about 11 to about 12.5 as measured at room temperature). Under these conditions, it is believed there is afforded a reactive intermediate nucleophilic species arising from the reaction of the cyanide ion with formaldehyde which hydrolyzes rapidly to form a further reactive species and in the presence of alkaline earth metal cations attacks the unsaturated system of maleic acid by a Michael-type 1,4 addition to afford a salt of carboxymethyloxysuccinic acid carrying cations corresponding to the cations of the alkaline media employed.

In addition, there is also a continual liberation of ammonia. Other salts of carboxymethyloxysuccinic acid may be obtained by conventional exchange technique and subsequent neutralization of the liberated carboxymethyloxysuccinic acid with the desired base.

More specifically, the alkaline medium used in the present invention is an aqueous medium derived from the addition of alkaline earth metal hydroxides and oxides (i.e., calcium, magnesium, strontium, barium, etc.) as well as zinc oxide and hydroxide and mixtures of the aforementioned with normal alkali metal hydroxides. When a mixture of alkaline earth metal cations and alkali metal cations are used, a mixed salt of carboxymethyloxysuccinic acid is obtained.

The amount of zinc or alkaline earth metal ions present in the reaction is preferably about 0.05 to 2.5 moles per mole of maleic acid, or other unsaturated poly carboxylic acid.

Thus, when the alkaline medium used is aqueous calcium hydroxide the resulting calcium salt of carboxymethyloxysuccinic acid may be exchanged for the trisodium or potassium salt by adding excess alkali metal (i.e., Na, K) carbonate to the reaction mixture and filtering off the precipitated calcium carbonate. Alternatively, the salt can be exchanged using conventional cation exchange resins well known to the art and the liberated carboxymethyloxysuccinic acid neutralized with the desired base (i.e., alkali metal hydroxide, ammonium hydroxide and suitable organic amines such as mono-, di- or tri-ethanolamine, morpholine, isopropanolamine, and mono- and dialkylamines containing 1–5 carbon atoms).

In addition to the carboxymethyloxysuccinates produced by the present invention, the ammonia produced in the reaction can be recycled by first converting to hydrogen cyanide by reaction with carbon monoxide or it may be reacted with sulfuric acid to form fertilizer grade ammonium sulfate.

The new process thus utilizes the basic raw materials of HCN, formaldehyde and maleic anhydride and is accordingly admirably suited for producing at reasonable cost the large tonnage requirements of the detergent industry for builders salts of carboxymethyloxysuccinic acid, a promising substitute for detergent phosphates.

In regard to the basic reactants used in the process of the present invention, it is preferred to use alkali metal and alkaline earth metal cyanides and the corresponding salts of maleic acid, although it should be appreciated that HCN and maleic anhydride can be employed to form the aforementioned salts in situ.

The reaction times and temperatures required in the instant process will vary somewhat with alkaline medium employed (i.e., pH) and thus will range from about room temperature (25° C.) to about 200° C.; however, most preferably the reaction will be effected at temperatures ranging between about 60 to 110° C.

The ratio of formaldehyde to cyanide to maleic anhydride reactants may be varied from 1:1:1 to about 2.0:2.0:1.0 with a preferred ratio of about 1.1:1.1:1.0.

In a preferred embodiment of the present invention an aqueous solution containing the formaldehyde and cyanide reactants are added gradually to a solution of the maleate salt at a temperature of about 60 to 110° C. and at a pH of about 11 to 12.5 for a period of about 1 to 3 hours.

It should be noted that the various modes of the process set forth above can be carried out either as a batch or a continuous process.

A surprising feature of the process is that the $NH_3$ that is simultaneously produced during the reaction, does not, as one would normally expect, appreciably react with maleate reactant or other reactive intermediates formed during reaction.

It will be apparent to those skilled in the art that many variations of the process are possible without departing from the spirit and scope of the invention. For example, although the use of alkali metal and alkaline earth metal cyanides and maleic acid salts are illustrated in the invention described above, it is now clear that any compound capable of furnishing cyanide anions and maleate anions may also be employed.

In addition, according to another embodiment of the invention, analogs and homologues of carboxymethyloxysuccinate salts can also be prepared with the instant process by utilizing aldehydes such as acetaldehyde, aldol, glyoxylic acid, glyoxal, glyceraldehyde, reducing sugars such as glucose in place of the formaldehyde reactant. The corresponding cyanohydrins, of course, can also be used as the reactant in place of the aldehyde and cyanide components.

According to still another embodiment of the present invention is the preparation of analogs and/or homologues of carboxymethyloxysuccinate salts by substituting for maleic acid other unsaturated carboxylic acids such as itaconic acid, aconitic acid and citraconic acid.

Example 1

Maleic anhydride 4.9 gm. (0.05 mole) is dissolved in 50 ml. of water and the pH adjusted to 11.4 with calcium hydroxide. Then, 4.1 gm. (0.05 mole) of 37.1% formaldehyde solution and 2.53 gm. (0.05 mole) of sodium cyanide are added and the resulting solution heated to 95–100° C. for 2 hours. The pH is maintained at 10 by further addition of calcium hydroxide as required. Throughout the reaction ammonia is continually evolved. After decomposing unreacted cyanide traces by the addition of hyrogen peroxide, excess sodium carbonate (10% molar excess based on the calcium hydroxide added) is added and the precipitated calcium carbonate filtered off. The pH of the filtrate is then adjusted to pH 8.6 with dilute sulfuric acid and evaporated in vacuo to afford a residue containing the desired trisodium carboxymethyloxysuccinate.

Example 2

Maleic anhydride (0.05 mole) is dissolved in 75 ml. of water and the pH adjusted to 10.4 using a mixture of sodium hydroxide and calcium hydroxide. Then, 0.05 mole formaldehyde (as a 37.1% solution) and 0.05 mole of sodium cyanide are added and the resulting solution heated to 65–70° C. for 4 hours. The pH is maintained at 9.0 by further addition of calcium hydroxide as required. Throughout the reaction ammonia is continually evolved. After decomposing unreacted cyanide traces by the addition of sodium hypochlorite, excess sodium carbonate (10% molar excess based on the calcium hydroxide added) is added and the precipitated calcium carbonate filtered off. The pH of the filtrate is then adjusted to pH 8.6 with dilute sulfuric acid and evaporated in vacuo to give a residue containing the desired trisodium carboxymethyloxysuccinate.

Example 3

Maleic anhydride 4.9 gm. (0.05 mole) is dissolved in 50 ml. of water and the pH adjusted to 11.4 with strontium hydroxide. Then, 0.1 mole of formaldehyde (as a 37.1% solution) and 0.1 mole of potassium cyanide are added and the resulting solution heated to 80° C. for 3 hours. The pH is maintained at 12.0 by further addition of strontium hyroxide as required. After decomposing unreacted cyanide traces by the addition of hydrogen peroxide, excess potassium carbonate (10% molar excess based on the strontium hydroxide added) is added and the precipitated calcium carbonate filtered off. The pH of of the filtrate is then adjusted to pH 8.6 with dilute sulfuric acid and evaporated in vacuo to give a residue containing the desired tripotassium carboxymethyloxysuccinate.

Example 4

Maleic anhydride 4.9 gm. (0.05 mole) is dissolved in 50 ml. of water and the pH adjusted to 11.4 with calcium hydroxide. Then, 4.1 gm. (0.05 mole) of formaldehyde (as a 37.1% solution) and 0.25 mole of calcium cyanide are added and the resulting solution heated to 95–100° C. for 2 hours. The pH is maintained at 10 by further addition of calcium hydroxide as required. Throughout the reaction ammonia is continually evolved. After decomposing unreacted cyanide traces by the addition of hydrogen peroxide, excess sodium carbonate (10% molar excess based on the calcium hydroxide added) is added and the precipitated calicum carbonate filtered off. The pH of filtrate is then adjusted to pH 8.6 with dilute sulfuric acid and evaporated in vacuo to give a residue containing the desired trisodium carboxymethyloxysuccinate.

Example 5

Maleic anhydride 4.9 gm. (0.05 mole) is dissolved in 50 ml. of water and the pH adjusted to 8.5 with zinc oxide. Then, 0.05 moles of formaldehyde (as a 37.1% solution) and 0.05 moles of sodium cyanide are added and the resulting solution heated to 95–100° C. for 4 hours. The pH is maintained on the alkaline side by further addition of zinc hydroxide as required. After decomposing unreacted cyanide traces by the addition of an oxidizing agent such as hydrogen peroxide, excess potassium carbonate (10% molar excess based on the zinc oxide added) is added and the precipitated zinc carbonate filtered off. The pH of the filtrate is then adjusted to pH 8.6 with dilute sulfuric acid and evaporated in vacuo to give a residue containing the desired tripotassium carboxymethyloxysuccinate.

Example 6

An aqueous solution (50 ml.) containing 0.055 moles of formaldehyde and 0.055 moles of sodium cyanide is added slowly over a period of about 1 hour to 50 ml. of water containing 0.05 moles of calcium maleate maintained at 95° C. and pH 10–11 with added calcium hydroxide as required. The reaction mixture is then heated to 100° C. for a further hour after which unreacted cyanide traces are decomposed by the addition of sodium hypochlorite. Excess sodium carbonate is then added and the precipitated calcium carbonate filtered off. The pH of the filtrate is then adjusted to pH 8.6 with dilute sulfuric acid and evaporated in vacuo to afford a residue containing trisodium carboxymethyloxysuccinate.

Example 7

Maleic anhydride (0.05 mole) is dissolved in 50 ml. of water and the pH adjusted to 11.4 with calcium hydroxide. Then, 0.075 mole of 37.1% formaldehyde solution and 2.53 gm. (0.05 mole) of sodium cyanide are added and the resulting solution heated to 95–100° C. for 2 hours. The pH is maintained at 10 by further addition of calcium hyroxide as required. Throughout the reaction ammonia is continually evolved. After decomposing unreacted cyanide traces by the addition of hydrogen peroxide, excess sodium carbonate (10% molar excess based on the calcium hydroxide added) is added and the precipitated calcium carbonate filtered off. The pH of the filtrate is then adjusted to pH 8.6 with dilute sulfuric acid and evaporated in vacuo to afford a residue containing the desired trisodium carboxymethyloxysuccinate.

Example 8

Maleic anhydride 9.8 gm. (0.1 mole) is dissolved in 50 ml. of water and the pH adjusted to 11.4 with calcium hydroxide. Then, 8.2 gm. (0.1 mole) of 37.1% formaldehyde solution and 2.53 gm. (0.05 mole) of sodium cyanide are added and the resulting solution heated to 40° C. for 5 hours. The pH is maintained at 10 by further addition of calcium hydroxide as required. Throughout the reaction ammonia is continually evolved. After decomposing unreacted cyanide traces by the addition of hydrogen peroxide, excess sodium carbonate (10% molar excess based on the calcium hydroxide added) is added and the precipitated calcium carbonate filtered off. The pH of the filtrate is then adjusted to pH 8.6 with dilute sulfuric acid and evaporated in vacuo to afford a residue containing the desired trisodium carboxymethyloxysuccinate.

Example 9

Maleic anhydride, 4.9 gm. (0.05 mole), is dissolved in 50 ml. of water and the pH adjusted to 12.0 with calcium hydroxide. Then 3.9 gm. (0.055 mole) of lactonitrile are added and the resulting solution stirred and heated at 95–100° C. for 3 hours. The pH is maintained at 11.8–12.0 by further addition of calcium hydroxide as required. Throughout the reaction ammonia is continually evolved. Excess sodium carbonate (10% molar excess based on the calcium hydroxide added) is then added and the precipitated calcium carbonate filtered off. The filtrate is then adjusted to pH 8.6 with dilute sulfuric acid and evaporated in vacuo to afford a residue containing the desired trisodium lactoxysuccinate.

It will be appreciated that the process of the invention may be conducted under pressure, if desired, especially when any of the reactants are gaseous or volatile.

It is intended to cover all changes and modifications of the preferred embodiments of the invention, wherein chosen for the purposes of illustration, which do not constitute departures from the spirit and scope of the invention.

What is claimed is:

1. A process for preparing a salt of an ether polycarboxylic acid by reacting in an aqueous alkaline medium an aldehyde and cyanide ions, or the corresponding cyanohydrin, with a salt of an unsaturated polycarboxylic acid selected from the group consisting of maleic acid, itaconic acid, aconitic acid and citraconic aid, in the presence of alkaline earth metal or zinc cations.

2. A process for preparing a salt of carboxymethyloxysuccinic acid which comprises reacting in an aqueous alkaline medium, formaldehyde and an alkali metal or alkaline earth metal cyanide with an alkali metal or alkaline earth metal salt of maleic acid at a temperature of from about 25° C. to about 200° C. and wherein the pH of the alkaline medium is 8–12.5 as measured at 25° C.

3. The process of Claim 1 wherein the unsaturated polycarboxylic acid is maleic acid.

4. The process of Claim 1 wherein the aldehyde is acetaldehyde, aldol, gloxylic acid, glyoxal, glyceraldehyde, glucose or formaldehyde.

5. The process of Claim 4 wherein the aldehyde is formaldehyde.

6. The process of Claim 4 wherein the aldehyde is acetaldehyde.

7. The process of Claim 1 wherein the aqueous alkaline medium is formed with an alkaline earth metal hydroxide or oxide, zinc oxide or hydroxide, or a mixture of one or more such hydroxides or oxides with an alkali metal hydroxide.

8. The process of Claim 7 wherein the aqueous alkaline medium contains calcium hydroxide, strontium, hydroxide, zinc oxide, magnesium hydroxide or barium hydroxide.

9. The process of Claim 1 wherein the amount of zinc or alkaline earth metal ions present is from about 0.05 to 2.5 moles per mole of the unsaturated polycarboxylic acid.

10. The process of claim 1 wherein the reaction is effected at a temperature of from about 25° C. to about 200° C.

11. The process of Claim 10 wherein the temperature of reaction is about 60–110° C.

12. The process of Claim 1 wherein the pH of the alkaline medium is about 8 to 13, as measured at 25° C.

13. The process of Claim 12, wherein the pH of the alkaline medium is about 11 to 12.5, as measured at 25° C.

14. The process of claim 1 wherein the molar ratio of the aldehyde to the cyanide ions and to the unsaturated polycarboxylic acid reactants is from about 1:1:1 to about 2:2:1.

15. The process of claim 1 wherein the salt of the unsaturated polycarboxylic acid is an alkaline earth metal salt.

16. The process of Claim 1 wherein the cyanide ions are derived from an alkali metal cyanide.

17. The process of claim 1 wherein the cyanide ions are derived from an alkaline earth metal cyanide.

References Cited

E. von Rudoff, et al.: Canadian J. of Chemistry, vol. 35, pp. 315–321, 1957.

LORRAINE A. WEINBERGER, Primary Examiner
P. J. KILLOS, Assistant Examiner

U.S. Cl. X.R.

260—429.9